(12) United States Patent
Kapitza

(10) Patent No.: US 6,452,625 B1
(45) Date of Patent: Sep. 17, 2002

(54) COMPACT VIDEO MICROSCOPE

(75) Inventor: Hans-Georg Kapitza, Oberkochen (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 09/254,209

(22) PCT Filed: Sep. 3, 1997

(86) PCT No.: PCT/DE97/01932

§ 371 (c)(1),
(2), (4) Date: Mar. 3, 1999

(87) PCT Pub. No.: WO98/10320

PCT Pub. Date: Mar. 12, 1998

(30) Foreign Application Priority Data

Sep. 3, 1996 (DE) .......................................... 196 35 666

(51) Int. Cl.[7] ............................. H04N 7/18; H04N 9/47
(52) U.S. Cl. ......................................................... 348/80
(58) Field of Search .......................... 348/79, 80; 3/335, 3/358, 337, 340, 333.01, 333.02, 333.12; 359/363, 369, 391, 385; H04N 7/18, 9/47

(56) References Cited

U.S. PATENT DOCUMENTS 4,206,966 A * 6/1980 Tyson et al. ............... 359/363
5,031,099 A * 7/1991 Kettler ....................... 382/133
5,332,905 A * 7/1994 Brooker et al. ............ 250/458.1
5,835,265 A * 11/1998 Mammone ................... 359/383
2001/0054691 A1 * 12/2001 Park et al. .................. 250/309

* cited by examiner

*Primary Examiner*—Nhon Diep
(74) *Attorney, Agent, or Firm*—Foley & Lardner

(57) ABSTRACT

The invention concerns a compact video microscope or video tube body (6) for all usual investigative methods. The video microscope can take the form of an enclosed microscope housing (1a) which, in addition the optical and mechanical components, comprises one or a plurality of electronic image sensors (24), a computer (25) and a flat screen (8). It can further consist of an ocular-free microscope stand (1b) and a modular video tube body (6) which can be attached thereto or mounted thereon. The enlarged image of the object is not observed via a conventional microscope tube body with oculars, but is made accessible on a flat screen (8) as a digital image which can be observed directly by the eye. In further embodiment, the light-optical microscopic image is displayed on a projection surface (9) directly behind the display plane of an at least partially transparent flat screen (8) and in particular enables the user to orient himself with respect to the object For the purposes of control and communication, the integrated video microscope can comprise a microphone (14), a loudspeaker (15) and a videocamera (16) directed towards the user. Images and associated data are stored in the integral digital mass storage devices (26) and can be digitally processed in the computer (25).

18 Claims, 4 Drawing Sheets

COMPACT VIDEO MICROSCOPE

BACKGROUND

The invention relates to a compact video microscope according to the preamble of claim 1, as it is described in EP 380 904 A1,and/or according to the preamble of claim 2.

U.S. Pat. No. 4,206,966 has disclosed a microscope in which for the purpose of visual representation the object image is projected onto the rear side of a ground glass screen which is accommodated in the upper housing part of the microscope and serves as a viewing screen. Moreover, U.S. Pat. No. 5,031,099 has disclosed a computer-assisted video microscope which comprises a microscope with a conventional microscope stand, a computer arranged separately therefrom, and peripherals associated with the computer, such as monitor, printer, keyboard etc. In this case, the computer includes diverse plug-in cards which permit both communication with the peripherals and the driving of different motor functions of the microscope—such as the motorized focusing drive and the motorized mechanical stage.

The substantial space requirement is a disadvantage of such non-integrated solutions, because the individual components—such as monitor, computer and other peripherals—are arranged next to one another on a working surface. Again, the many connecting cables required reduce the reliability of the overall design and constitute obstacles in the operating environment. The representation of high-resolution images has to date been associated with monitors having picture tubes with a large screen diagonal, because by contrast with flat screens the individual pixels are relatively large with picture tubes. Associated with this is not only a high space requirement, but also a high weight of the monitor, and this makes it difficult to use the overall system at changing locations. Likewise a hindrance to such use at changing locations is the need to disconnect cable connections during disassembly and to have to reestablish them during assembly.

The device described in WO 96/20421 A1 serves the purpose of observing a current microscopic image in common with a pictorial representation of a spatial object obtained by a second device. The known arrangement is characterized in that it includes an "adaptive control device" which by automatically matching the two pictorial representations always offers the observer a geometrically consistent superimposed image. What is decisive here is that this "adaptive control device" uses algorithms, position-measuring devices and positioning motors to relieve the user of the work of correctly setting in spatial and geometric terms the microscopic representation and that produced otherwise. Separate monitors are used for the representation, while small displays which are observed via the oculars of the microscope used provide an alternative.

By contrast, the video microscope or the video tube according to the invention permits the visual manual production of a superimposition of the current microscopic image and a stored—preferably microscopic—image in apparently one plane directly on the integrated flat screen.

DE 196 09 288 A1 describes a video microscope which is installed in the form of a miniaturized module in a commercially available computer and is typically accommodated in a drive bay of said computer, or is operated as an external unit in a commercially available peripheral housing for computers. With its automated feed of standard specimen slides, this miniaturized microscope is suitable chiefly for routine tasks in medical laboratories. It represents, as it were, a counterpart to the present application, because in DE 196 09 288 A1 the microscope is installed in an existing computer, while the video tube according to the invention either contains the computer or is operated with a separate computer.

The quantitative optical microscope described in EP 380 904 A1 aims at creating a very high-resolution optical microscope for quantitative imaging using large sensor surfaces and high-aperture objectives for producing very large ("ultrawide") visual fields. The central aim of this optical arrangement is direct imaging of the object onto an image sensor while omitting any further imaging optical elements between the objective and image sensor. A high image resolution is to be achieved both by a large visual field in conjunction with a high numerical aperture of the objective, and by a large-area image sensor provided with many pixels. It is to be rendered possible thereby to use a single image to obtain a good overview, and also to study details at any desired point by observing a subsequently determined section. This known proposed solution would require the creation and provision of such special objectives. The commercially available objectives quoted in the description do not deliver this type of imaging by themselves, since they require either additional compensating optical systems, or else a tubular lens in order to meet the demands of adequate optical correction, and/or to generate at all a real optical intermediate image. However, it is precisely these additional optical systems which the invention aims to exclude. Furthermore, the use of a video signal for transmitting image data between the image sensor and computer is expressly excluded. Again, aspects of an integration of all the components into a single housing, and the exclusive observation via a screen are neither addressed nor set forth.

A disadvantage in the principle of known proposed solutions is to be seen in that microscopic images for electronic image sensors—such as CCD cameras—are generated by an imaging optical system which is connected to the same tube and the associated tubular lens which also generates the intermediate image for the oculars. In the case of the use of the nowadays generally customary objectives for optical microscopes, the optical system for the image sensor or sensors is always situated downstream of a tubular lens. However, because the diagonals of the active receiving surfaces of image sensors are much smaller than the relatively large intermediate images required for the oculars, in the designs nowadays customary the image enlarged by the tubular lens is subsequently reduced again for projecting onto the image sensors. This contradicts the basic requirement of generating an optical microscopic image using as few lenses as possible, in order to keep disturbing influences—such as reflections and light absorption by the optical components—slight.

SUMMARY OF THE INVENTION

It is therefore the object of the present invention to create a video microscope or a video tube for microscope stands for all contrasting methods and types of specimen customary in optical microscopy which permits a compact design, a more comfortable way of observing the image and the data linked to it, as well as permitting operation which is supported to the greatest possible extent by suitable software.

This object is achieved by means of a video microscope having the features described herein, and by a video tube having the features described herein. Advantageous developments of said microscope or video tube are the subject matter described herein.

For such a microscope or for a video tube of such a type, the weight and the space requirement of the overall system are lastingly reduced. Finally, the purely light-optical observation of the image with the aid of tube and ocular(s) is dispensed with. Instead of this, it is rendered possible to orientate in the specimen by the optical representation of a survey image on the rear side of a flat screen. It is rendered possible to record, represent and document microscopic images in a purely electronic way without the assistance of film material or other image carriers of a chemical nature. By virtue of the fact that it is possible to install in the optical microscope components such as microphone, loudspeaker and miniature video cameras which are, for their part, linked to the installed computer via corresponding electronic signal transducers, further possibilities arise directly at the optical microscope from voice control of the optical microscope, the recording of voice data accompanying the image, and telecommunication including a video conference.

The video microscope according to the invention, or the video tube according to the invention has a closed housing inside which and on whose outer surfaces all the optical and electronic components are arranged for electronically recording and representing microscopic images of an optical microscope. For the purpose of recording microscopic images, the same housing contains electronic image sensors such as, for example, one or more two-dimensional or cellular CCD sensors with a sufficiently large number of pick-up elements, and the electronic components linked thereto, which serve the purpose of amplifying, influencing and digitizing the electric currents which originate from the image sensors and carry the image information. In addition, the same housing contains a computer and a flat screen for representing the microscopic images and data, along with operating surfaces which are generated by software in the computer. Components such as microphone, loudspeaker and miniature video camera can, in addition, be installed in the same housing.

In an alternative exemplary embodiment, the video microscope or the video tube is equipped for direct light-optical projection of images onto the rear side of the flat screen or a suitable projection surface in a plane which lies in or immediately downstream of the imaging plane of the flat screen, with the result that the projected light-optical image is visible to the observer inside the surface of the flat screen. It is possible there, given the use of the installed or another, remote computer for images to be observed together with characters, graphics and other images already generated electronically, without the assistance of oculars or similar optical systems. This device can be switched on quickly at any time in order to facilitate the search for specimens.

Optical inputs and outputs are present with both variants of the microscope or video tube according to the invention. Classical external components for optical microscopic methods—such as co-observing devices together with normal tubes and oculars, photographic cameras, video cameras, image-reflecting units, drawing apparatuses and other known accessories—can be connected via said input and output. Said input and output can also be used in the known way to employ modules for confocal microscopy and laser devices.

Virtually all recent optical microscopes use the so-called infinite optical system, in which the objective initially unites the beams, which originate from objects out of the front focal plane, downstream of the objective with intersection points at an infinite distance. A tubular lens of suitable focal length generates the first intermediate image at a finite spacing, 160 to 250 mm being customary. Further lenses for adapting image sensors come into use downstream of said tubular lens, whose intersect distance is calculated for the generation of a relatively large intermediate image which can be employed for the use of oculars. Since the active surface of customary image sensors has much shorter—diagonals 4 to 12 mm being typical at present—than the diameter, usual in the oculars, of the intermediate images (18 to 28 mm), the initially magnified images are subsequently substantially demagnified by adapter optical systems, which are complicated in part, for the purpose of adapting the visual field to the image sensors.

In the video microscope or video tube according to the invention, this situation is avoided in principle by virtue of the fact that no oculars are used for observing the images. The images are observed via the installed flat screen, using the unaided eye. This also eliminates the need to use a tubular lens with a long intercept distance, as is mandatory when using oculars. Instead of this, it is chosen to generate images for the image sensors more simply by contrast with the practice just described: the quasi-parallel light beams generated by the objective of the video microscope are focused directly onto the active surface of the image sensors, without the use of a tubular lens, by means of a zoom optical system of variable focal length but fixed image position. The use of such zoom objectives upstream of the image sensors permits the total magnification realized in the digital image, and thus also the size of the visual field on the object side to be conveniently adapted to the specimen situation. The change in the focal length can be supported via the installed computer and a motor controller connected to the zoom objective. Using suitable encoders, the respectively updated value of this additional image scale is recorded by the computer in a known way, displayed and taken into account in the digital image evaluation.

In addition, said optical system, which is driven by one or more motors and also by the computer, can also be used to undertake a correction to the image position as a function of the wavelength of the light employed, or of the focal deviation of the microscope objective used.

BRIEF DESCRIPTION OF THE DRAWINGS

Details of the invention are explained in more detail below with the aid of the exemplary embodiments represented in the figures, in which:

FIG. 3 shows a vertical section through the microscope as in FIG. 2, with the representation of the alternative design, in which the light-optical representation of the projection is switched on;

FIG. 4b shows a vertical section through the center plane of the video tube in conjunction with the microscope stand in accordance with FIG. 4a;

FIG. 6 shows a vertical section through a further embodiment, the light-optical representation of the projection being switched on.

DETAILED DESCRIPTION OF THE EXEMPLARY EMBODIMENTS

Figure 1A:
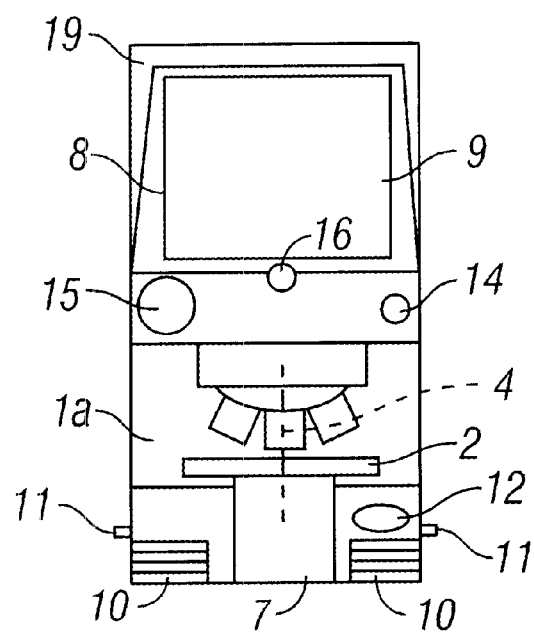
FIG. 1a shows a front view of a-compact video microscope according to the invention.
Figure 1B:
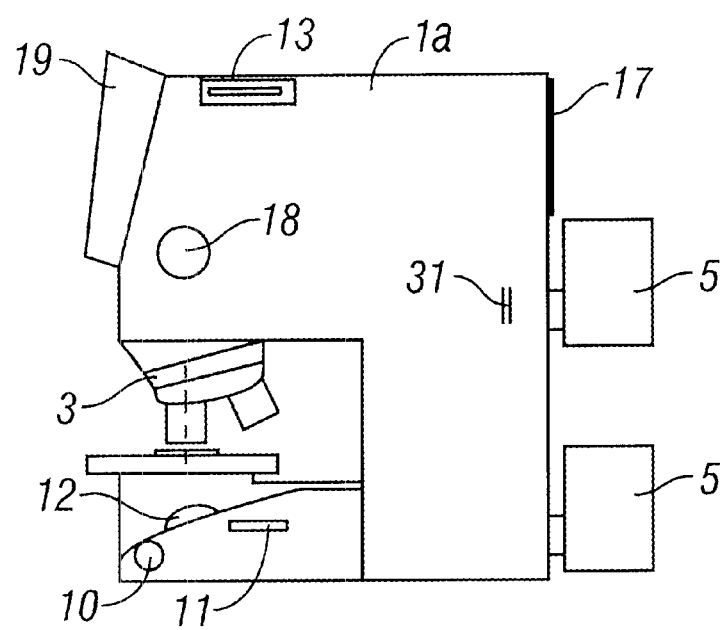
FIG. 1b shows a corresponding side view.

The front and side views of the integrated microscope are respectively represented in FIGS. 1a and 1b. In its lower part, the housing (1a) contains all the components which a universal optical microscope usually has for transmitted-light and reflected-light methods. For the purpose of better orientation, the microscope stage (2), the revolving nosepiece (3), objective (4) and light sources (5) may be named as representative components. It is also possible to operate luminaires of low power inside the housing (1a). Depending on the level of motorization, microscope components are also operated by hand, as is the case for reflected light in the example with the filter slides (31), or adjusted by motor, as in the case of the condenser for transmitted light, which is hidden in the housing foot (7). However, an attempt will be made in principle to provide as many components as possible with encoders and motors, in order to control them with the installed computer under the supervision of software. However, it is also possible to operate any desired components by hand, encoders then being advantageous for feedback to the computer. Installed in the upper part of the housing (1a) is a flat screen (8) which faces the observer and behind which there is positioned a suitable projecting surface (9) which not only supports the homogeneous illumination of the flat screen (8) in normal operation, but also serves as a projection screen (9) for optical projections by the optical microscope. Within a persons hand reach in the lower part of the housing (1) are operating elements for coarse and fine focusing (10) of the microscopic image by displacing the objective (4) or stage (2), brightness of the light sources (5) or setting the zoom factor (11) and an input unit for a cursor (12) which permits the interaction with the computer software and is used to adjust the coordinates of a motorized microscope stage. One or more storage devices for exchangeable data carriers (13)—such as floppy disks, disks, magnetic tapes or others—are installed for data exchange with the computer (25). A microphone (14) is provided on the front side for recording voice data, specifically both for recording commentaries accompanying the images and for voice control of the integrated microscope. The reproduction is performed, inter alia, by the installed loudspeaker (15). Furthermore, if required a miniaturized video camera (16) is provided which permits video conferences over relatively large distances. Located on the rear side of the device is the termination panel (17) of the computer, to which there are connected in a known way the plugs for keyboards, printer, lines for remote data transmission and other relevant units. Sealable connections (18) for external optical components—such as devices for co-observation or reflecting images or light beams into the beam path of the optical microscope—can be provided on one or both side face(s) of the housing (1a). In the case of unfavorable illuminating conditions at the location of the microscope, remedy is provided by a protector shield (19) which keeps ambient light incident from above away from the flat screen (8) and the projection surface (9) connected thereto.

Figure 2:
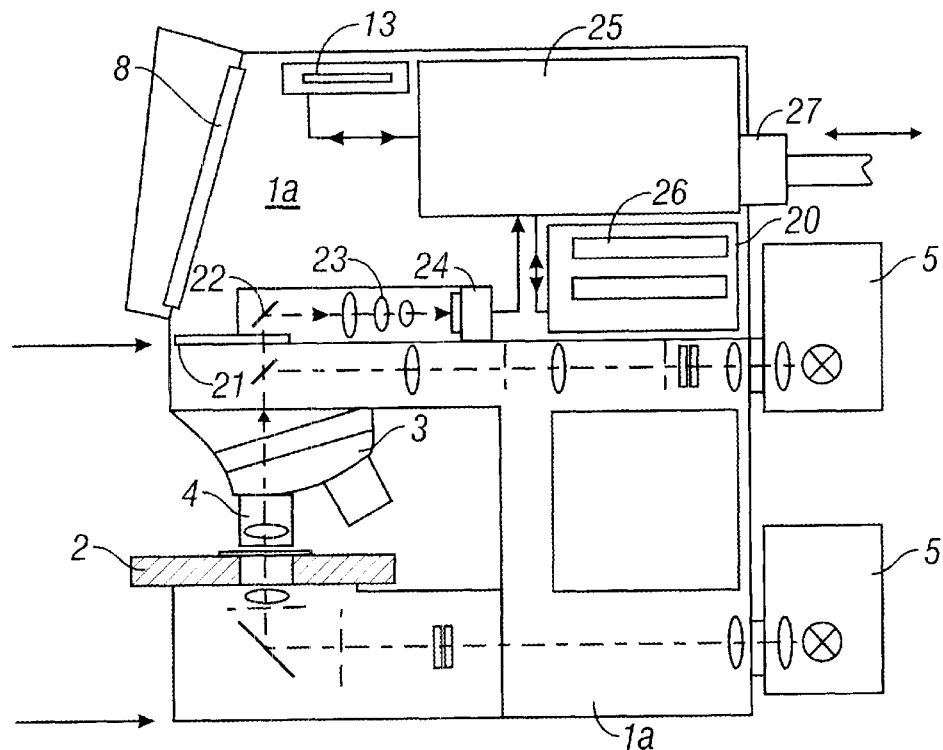
FIG. 2 shows a vertical section through the center plane of the microscope according to the invention, in which the most important optical axes run.

The beam path and the elements for electronic image generation are represented in FIG. 2. The components, which belong to the design of a classical optical microscope with objectives of infinite focal length, are located between the two arrow marks, and require no further explanation. The upper arrow marks the plane in which a tube with a tubular lens, folding bridges and oculars is normally mounted. In this arrangement, the light beams for generating the microscopic image come from the objective (4) and pass one or more light filters (21) which are preferably arranged in motorized filter wheels or slides. Contrasting the image, dimming the light and, in particular, generating color separations can be achieved by the filters. The use of imaging lenses or lens systems for representing the focal plane of the microscope objective, or for the survey representation of the specimen is also provided here. A deflecting mirror (22) or suitable deflecting prism is used to feed the light with the zoom optical system (23) which generates the microscopic image on the active surface of an electronic image or line sensor (24). A plurality of image sensors (24) can optionally be used downstream of the zoom optical system (23), by virtue of the fact that either the light beam directs the light onto said sensors via a movable mirror or beam splitter, or that the image sensor or sensors (24) currently being used are brought into the image plane with their active surface. Via the electronic system connected to the image sensor, the image signal is fed to the computer (25), which is supplied by its own power supply unit (20). From there, it is visualized on the flat screen (8), and can be stored on exchangeable storage media (13) or permanently installed storage media (26)—such as, for example, fixed magnetic disks. The termination panel (17) of the computer (25) can also be used to send the image to other devices together with other data via data lines (27). Of course, it is also possible for images and data from other devices to be received via such lines for the purpose of representation on the flat screen, and of further use.

Up to three different types of image sensor (24) come into use alongside one another: high-resolution sensors for image recording, preferably black/white CCD sensors which record the microscopic image directly or after spectral decomposition with the filters (21) one after another in color separations—for example red, green and blue. Said color separations are combined by the computer (25) to form color images and are represented on the flat screen. A further image sensor preferably makes available a color television image with a high repetition rate for scanning the specimen, which is recorded by the computer (25) in accordance with one of the usual video standards, and is represented on the flat screen (8) without a disturbing delay. Finally, a line sensor permits survey images to be recorded by imaging via a special objective (4) or a lens in the filter wheel (21), or both simultaneously. In order to produce the survey image, the object is then moved linearly, manually or by motor, with the microscope stage (2), and recorded by the computer (25). For this purpose, the microscope stage (2) has at least one suitable displacement sensor for transmitting the actual position to the computer (25). All the sensors are protected by suitable measures for screening against electromagnetic irradiation, and can be cooled, if required, in order to expand the useful range of sensitivity by longer integration times.

Figure 3:
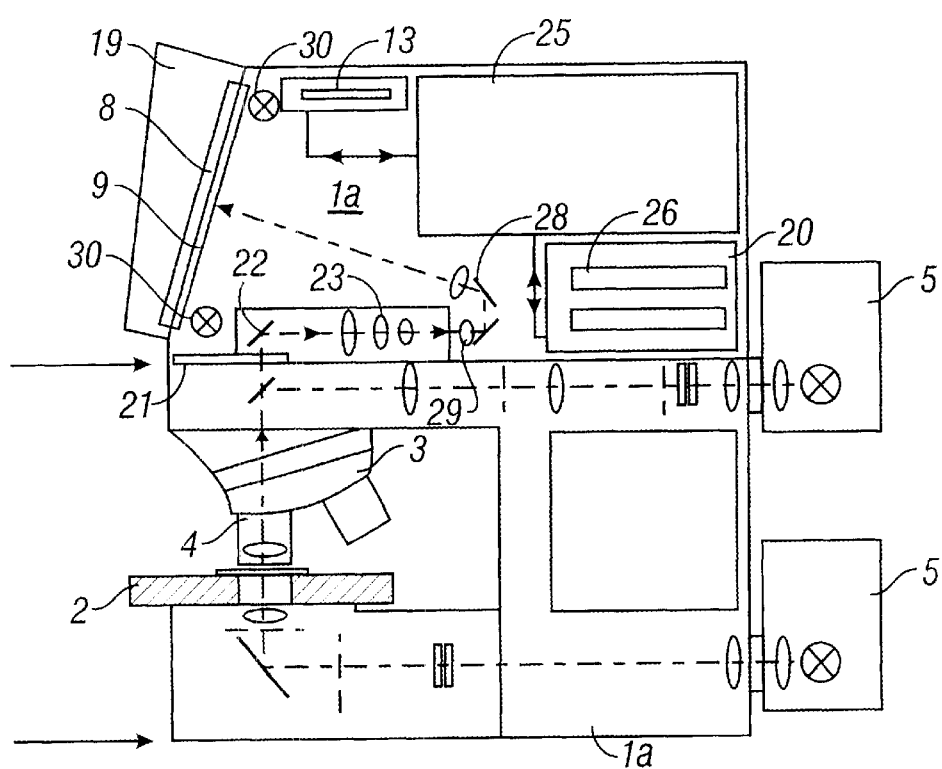

The optical representation of the microscopic image on a projection screen (9) which is arranged directly downstream of the flat screen (8) is represented in FIG. 3. For this purpose, the light downstream of the zoom optical system (23) is not directed onto the image sensor, but is directed with substantial magnification via the mirror group (28) and a further intermediate optical system (29) onto the projection screen (9) and visualized there for one or more persons. Together with a suitable illumination (30) of the flat screen, it is also possible for alphanumeric characters and graphics to be superimposed on said optically generated image by means of suitable software and with the aid of the computer (25) for the purpose of observation and interaction.

Finally, for the purpose of comparison and as an aid for aligning objects it is possible for stored, digital and current optical images to be superimposed for observation. In particular, for reflected-light specimens in the form of polished sections this results in new possibilities of specifically retrieving specimen sites whose relative positions have once been stored. For this purpose, a stored image of the specimen is brought into coincidence, by compression, expansion, rotation and displacement of its previously obtained digital image on the flat screen (8) with the superimposed optical image on the projection surface (9). Thereafter, coordinates previously stored in the computer (25) can be used to retrieve specific sites.

As an alternative, this projection can also be performed without using the zoom optical system (23) by using mirrors (28) or prisms and a lens group (29) of long focal length to project light coming from the objective (4) directly onto the projection surface (9).

Figure 4A:
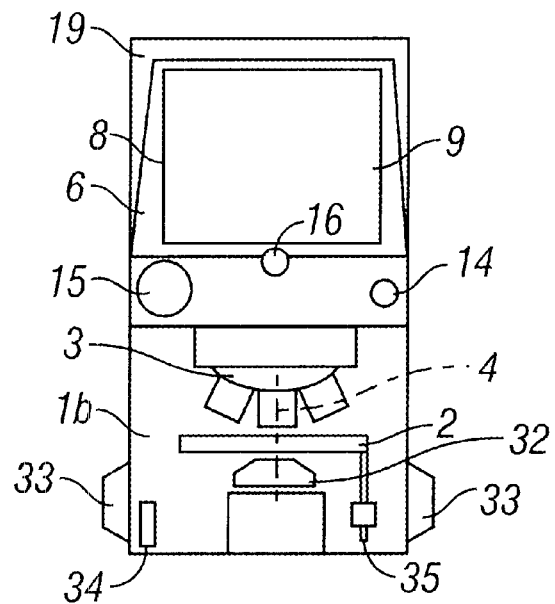
FIG. 4a shows a front view of a combination of a microscope stand and the video tube according to the invention.
Figure 4B:
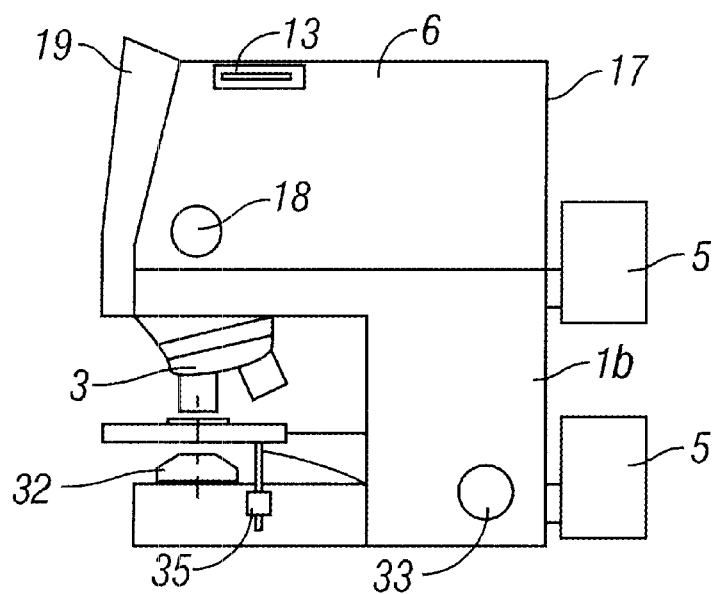
Figure 5:
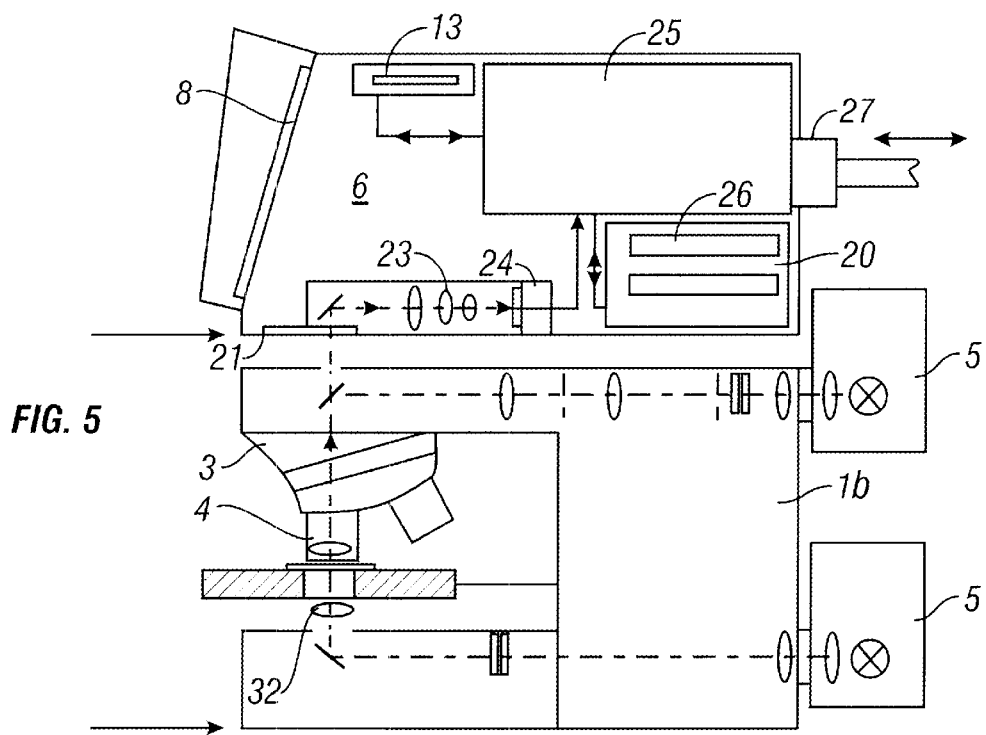
FIG. 5 shows a vertical section through the video tube and the microscope stand, an intermediate spacing having been left between the two units for the purpose of a better representation of the modular character of the video tube.
Figure 6:
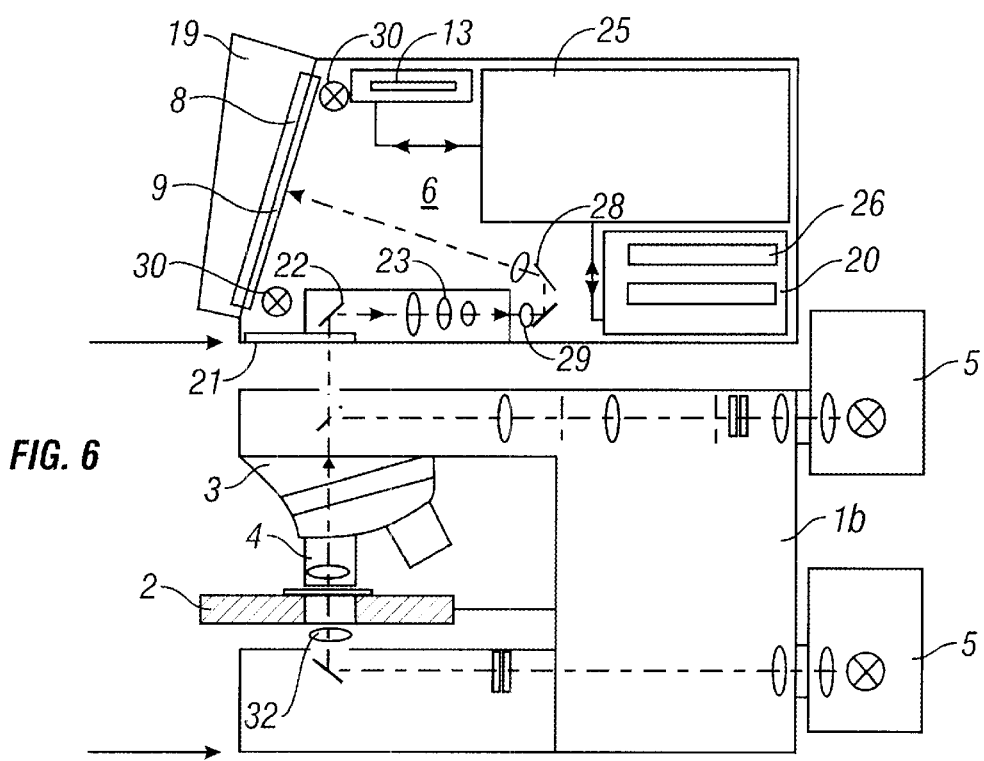

A two-part variant of the video microscope according to the invention—comprising a video tube (6) of modular design and a microscope stand (1b)—is represented in FIGS. 4 to 6. Analogous reference numerals from FIGS. 1 to 3 also apply to this embodiment. The microscope stand (1b) has, inter alia, a substage condenser (32), a focusing device (33), a controller (34) for the lamp voltage and a coaxial drive (35). The functioning of this video tube (6) in cooperation with the microscope stand (1b) corresponds to the integrated, compact video microscope already described above.

List of Reference Numerals

1a Microscope housing
1b Microscope stand
2 Microscope stage
3 Revolving nosepiece
4 Objective(s)
5 Light source(s)
6 Video tube
7 Housing foot
8 Flat screen
9 Projection surface/projection screen
10 Coarse and fine focusing
11 Setting member for the zoom factor
12 Cursor
13 (interchangeable) Data carriers/storage media
14 Microphone
15 Loudspeaker
16 Video camera
17 Termination panel
18 Connections
19 Protective shield
20 Power supply unit
21 Light filter/filter wheel
22 Deflecting mirror
23 Zoom optics/zoom system
24 CCD image sensor
25 Computer
26 Storage media (permanently installed)
27 Data lines
28 Reflecting mirror
29 Intermediate optical system
30 Illumination
31 Filter slide
32 Substage condenser
33 Focusing device
34 Controller for the lamp voltage
35 Coaxial drive

What is claimed is:

1. Compact video microscope having a light source (5), an objective (4) and a zoom system (23) which is connected downstream of the objective (4) and focuses the object light coming from the objective (4) directly onto a CCD image sensor (24), and having a computer (25) which is controlled by the image sensor (24) and outputs the image of the object onto a screen (8), the screen (3) being the sole output medium for visual observation of the object, wherein
   (a) the microscope is constructed in a unipartite housing (1a) which holds the computer (25),
   (b) the screen is constructed as a transparent flat screen (8) and integrated on the observer side into the upper part of the housing (1a),
   (c) the CCD image sensor (24) is excludable from being struck by object light and, in the decoupled state of the image sensor (24), the object light falls onto at least one reflecting mirror (28) and/or prism which is disposable into the beam path and projects the object light onto the side of the screen (8) averted from the observer, and
   (d) with the aid of the screen (8) graphics, alphanumeric characters and/or stored object images which were recorded by the image sensor (24) before the projection of the current object image are superimposable on the projected, current object image.

2. Compact video microscope comprising a stand (1b) and a video tube (6), the stand (1b) having at least one mountable light source (5), a microscope stage (2) and at least one objective (4), wherein
   (a) the video tube (6) is adaptable as a module on or at the ocular-free stand (1b), and includes
      (b1) a deflecting mirror (22) for the imaging beam coming from the objective (4),
      (b2) a zoom system (23) which is connected downstream of the deflecting mirror (22) and focuses the beam directly onto a CCD image sensor (24), as well as
      (b3) a computer (25) which is controlled by the image sensor (24) and outputs the image of the object on a screen, the screen being the sole output medium for visual observation of the object and being constructed as a transparent flat screen (8) and integrated in the video tube (6) on the observer side; in that
   (c) the image sensor (24) is excludable from being struck by object light and, in the decoupled state of the image sensor (24), the object light falls onto at least one reflecting mirror (28) and/or prism (29) which is disposable into the beam path and projects the object light onto the side of the screen (8) averted from the observer, and
   (d) with the aid of the screen (8) graphics, alphanumeric characters and/or stored object images which were recorded by the image sensor (24) before the projection of the current object image are superimposable on the projected, current object image.

3. Microscope according to claim 1, wherein stored object images are present on data carriers (13, 26).

4. Microscope according to claim 3, wherein the data carriers (13) are interchangeable.

5. Microscope according to claim 1, wherein the image sensor (24) records only in terms of light/dark, and colored object images are generated by the computer (25) from three primary colors with the aid of light filters (21) and a downstream additive mixing unit.

6. Microscope according to claim 1, wherein a termination panel (17) is fitted on the rear side of the microscope housing (1a) or the video tube (6) for telecommunication.

7. Microscope according to claim 1, wherein the microscope is equipped with a microphone (14) for voice control and/or voice recording, and with a conference camera (16) with an associated loudspeaker (15).

8. Microscope according to claim 1, wherein the microscope has optical inputs and/or outputs (18) for classical external optical components.

9. Microscope according to claim 1, wherein the microscope is constructed as an inverted light microscope, and the observer-side screen (8) is arranged in the lower part of the housing.

10. Microscope according to claim 2, wherein stored object images are present on data carriers (13, 26).

11. Microscope according to claim 10, wherein the data carriers (13) are interchangeable.

12. Microscope according to claim 2, wherein the image sensor (24) records only in terms of light/dark, and colored object images are generated by the computer (25) from three primary colors with the aid of light filters (21) and a downstream additive mixing unit.

13. Microscope according to claim 2, wherein a termination panel (17) is fitted on the rear side of the microscope housing (1a) or the video tube (6) for telecommunication.

14. Microscope according to claim 2, wherein the microscope is equipped with a microphone (14) for voice control and/or voice recording, and with a conference camera (16) with an associated loudspeaker (15).

15. Microscope according to claim 2, wherein the microscope has optical inputs and/or outputs (18) for classical external optical components.

16. Microscope according to claim 2, wherein the microscope is constructed as an inverted light microscope, and the observer-side screen (8) is arranged in the lower part of the housing.

17. A compact video microscope, comprising:
a light source;
an objective;
an image sensor;
a screen;
a zoom system disposed downstream of the objective and that focuses object light coming from the objective directly onto the image sensor; and
a computer, disposed in a unipartite housing of the microscope, and controllable by the image sensor for outputting the image of the object onto the screen, wherein the screen is the sole output medium for visual observation of an object and wherein the screen comprises a transparent flat screen integrated on an observer side into an upper part of the housing, wherein the image sensor is excludable from being struck by object light and, in a decoupled state of the image sensor, the object light falls onto at least one reflecting mirror and/or prism which is disposable into the beam path and projects the object light onto the side of the screen averted from an observer, and with the aid of the screen, graphics, alphanumeric characters and/or stored object images, which were recorded by the image sensor before projection of the current object image, are superimposable on the projected, current object image.

18. A compact video microscope, comprising:
a video tube; and
an ocular-free stand; wherein the stand comprises
at least one mountable light source,
a microscope stage, and
at least one objective;
wherein the video tube is adaptable as a module on or at the ocular-free stand, and includes
a deflecting mirror for an imaging beam coming from the objective,
a zoom system coupled downstream of the deflecting mirror and for focusing the beam directly onto a CCD image sensor, and
a computer controllable by the image sensor and for outputting the image of an object on a screen, the screen being the sole output medium for visual observation of the object and being constructed as a transparent flat screen and integrated in the video tube on an observer side,
wherein the image sensor is excludable from being struck by object light and, in a decoupled state of the image sensor, the object light falls onto at least one reflecting mirror and/or prism which is disposable into the beam path and which projects the object light onto a side of the screen averted from an observer, and
wherein, with the aid of the screen, graphics, alphanumeric characters and/or stored object images which were recorded by the image sensor before the projection of the current object image are superimposable on the projected, current object image.

* * * * *